United States Patent Office 3,577,223
Patented May 4, 1971

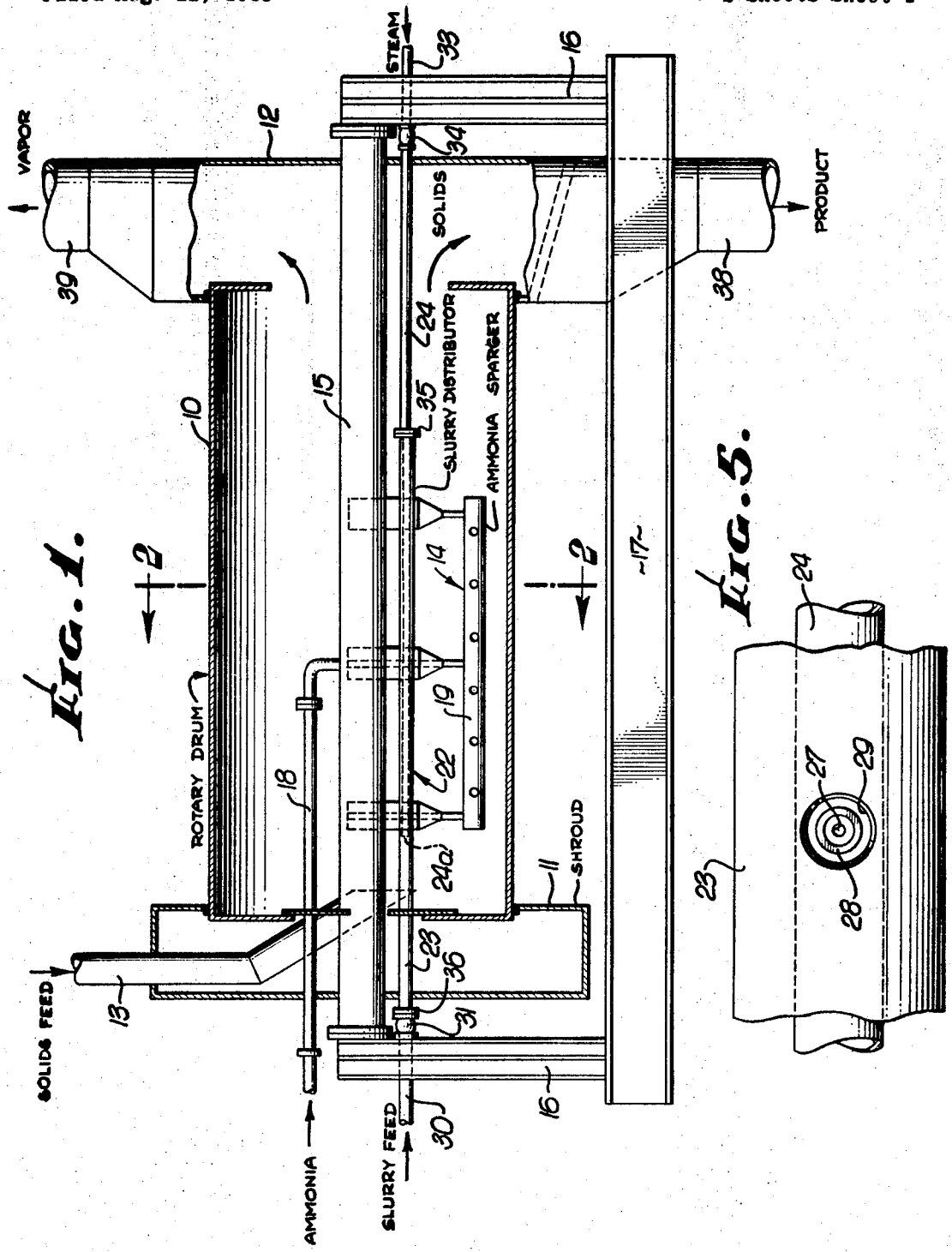

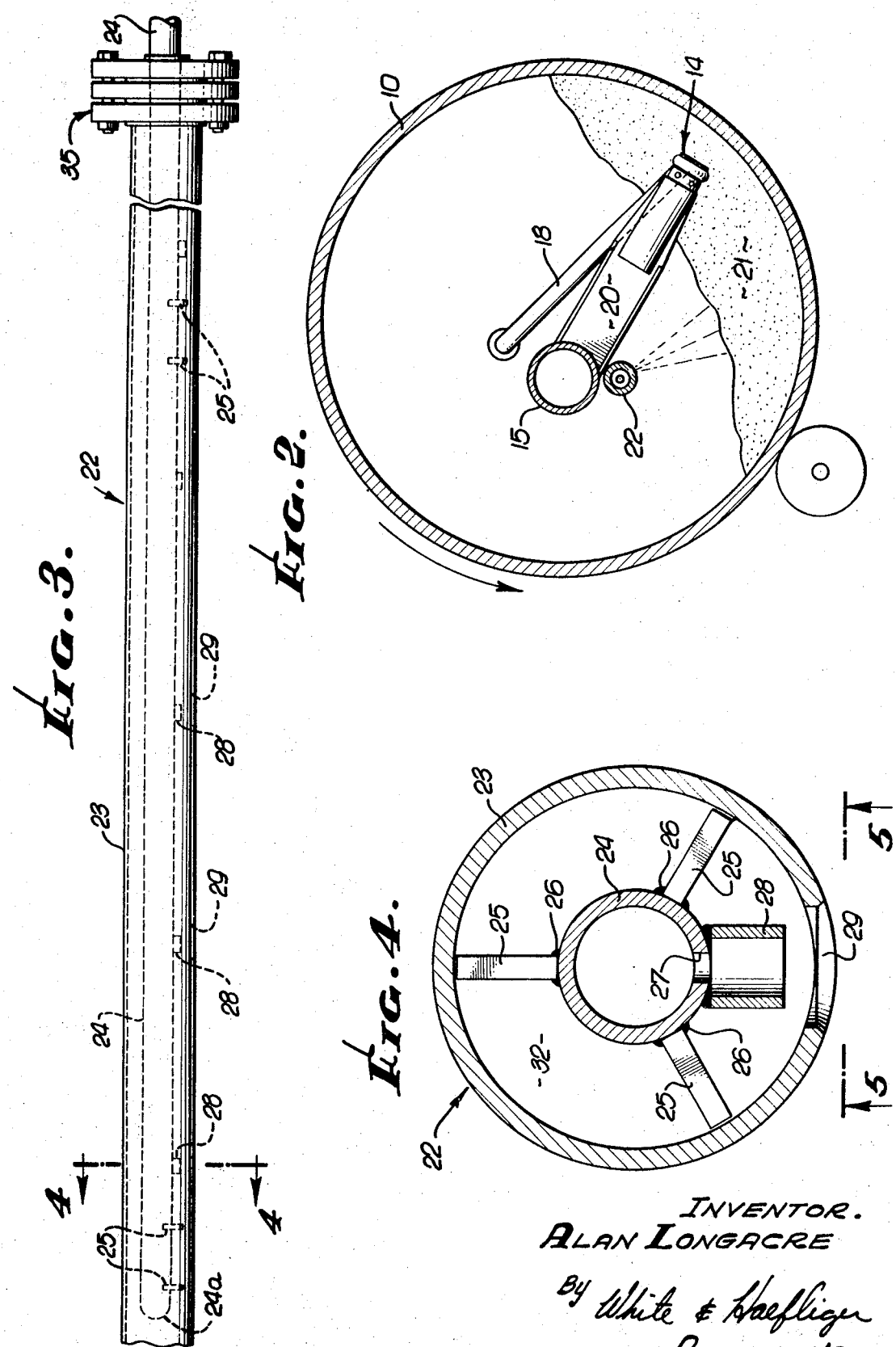

3,577,223
SLURRY DISTRIBUTOR
Alan Longacre, Whittier, Calif., assignor to Fluor
Corporation, Los Angeles, Calif.
Filed Aug. 11, 1969, Ser. No. 849,096
Int. Cl. B01j 2/12
U.S. Cl. 23—259.1                                10 Claims

ABSTRACT OF THE DISCLOSURE

Partially ammoniated phosphoric acid slurry is distributed onto a bed of ammonium phosphate granules by a tubular distributor comprising concentric pipes spaced to provide a passage for the slurry which is aspirated by steam discharged from the inner pipe through nozzles spaced from and alined with countersunk openings in the outer pipe.

BACKGROUND OF THE INVENTION

The distribution of hot, partially ammoniated phosphoric acid on a bed of rolling solids in a granulator has long been a problem. Many different devices have been tried in attempts to achieve uniform wetting of the bed to optimize granulating conditions. Most of the devices, such as open-end pipes, perforated pipes, fantail sprays and sawtooth troughs, fall short of satisfactory performance over the full range of operations. Devices that distribute reasonably well at full design flow fail to distribute or give erratic results at reduced rates. Precipitation or freezing out of solids is a frequent problem which aggravates the poor distribution at low flow rates.

SUMMARY OF THE INVENTION

The present invention has for its object to provide an improved device useable for the distribution of viscous liquids and slurries generally which would tend to foul conventional spray nozzle or other dispersion devices which rely upon liquid stream pressure for motivating force. The invention is operable to particular advantage for the discharge within a rotary ammoniator-granulator of partially ammoniated phosphoric acid slurry onto a bed of ammonium phosphate granules or granules composed of ammonium phosphate with other fertilizer materials. As used herein "ammonium phosphate" is inclusive of diammonium phosphate and other possible solid reaction products of ammonia and phosphoric acid.

Structurally the invention achieves its capacity for continuous and uniform slurry distribution by the employment of outer and inner concentric pipes annularly spaced to provide a slurry passage between them, the inner pipe carrying nozzles alined with countersunk openings in the wall of the outer pipe and serving to discharge gas so as to aspirate the slurry flow and dispersion out through the countersunk openings.

In the operation of an ammoniator-granulator, the use of steam for the slurry projection serves both as a propellant and a heating medium for maintenance of a slurry viscosity that will assure non-clogging trouble-free operation and maintenance of the distributor.

All the features and objects of the invention and its operation in a slurry granulator will be understood more fully from the following description of an illustrative embodiment appearing in the accompanying drawings.

BRIEF DESCRIPTION OF THE DRAWINGS

FIG. 1 is a sectional illustration of a known type of ammoniator-granulator within which is accommodated the present slurry distributor;

FIG. 2 is an enlarged cross section on line 2—2 of FIG. 1;

FIG. 3 is a fragmentary showing of the slurry distributor in side elevation;

FIG. 4 is an enlarged cross section on line 4—4 of FIG. 3; and

FIG. 5 is a fragmentary showing of the slurry distributor discharge configurations as viewed from line 5—5 of FIG. 4.

DESCRIPTION OF THE PREFERRED EMBODIMENTS

FIG. 1 depicts generally a known type of ammonium phosphate granulator comprising a drum 10 rotatable within feed end shroud 11 and a discharge end shroud 12, granular phosphate feed to the drum occurring through duct 13. The drum end and shroud assembly accommodates what is termed an ammonia sparger generaly indicated at 14 and carried by a pipe support 15 extending through the granulator and terminally supported as by members 16 above a suitable base 17. The sparger 14 being known, for present purposes it will suffice to limit its description to the combination of an ammonia feed line 18 which leads to the apertured sparger pipe proper appearing at 19 and carried by arms 20 extending from the support 15. Concerning the function of the sparger, its purpose is to more completely ammoniate the slurry feed to the granulator by ammonia discharge into the granules bed appearing at 21 in FIG. 2.

The present invention is more directly concerned with the improved form of slurry distributor appearing in FIGS. 3, 4 and 5 and at 22 in FIG. 2 where the device is shown to be positioned generally beneath the support 15 for slurry discharge and distribution onto the granules bed 21.

The distributor 22 is shown to comprise an outer pipe 23 and an inner pipe 24 maintained in centered spaced position within the outer pipe as by radial spacers 25 welded at 26 to the inner pipe. The latter is shown to have a series of discharge openings 27 coaxially alined with larger diameter nozzles 28 which in turn are coaxially alinable with countersunk openings 29 in the outer pipe 23.

In reference again to FIG. 1 partially ammoniated phosphoric acid slurry is delivered from feed line 30 past valve 31 into flow passage 32 between the distributor pipes 23 and 24. Low pressure steam derived from line 33 and supplied past valve 34 to pipe 24 functions to aspirate the slurry out through the nozzle and aperture arrangement of FIG. 4. As will be understood, the inner end of pipe 24 is closed at 24a and it is found advantageous to form the distributor with interconnected flanges 35 and 36 to facilitate removability of the distributor for inspection or cleaning.

In the operation of the distributor, steam jets discharging through openings 27 into the nozzles 28, act to induce and project the slurry from within passage 32 outwardly through the countersunk openings 29 whose configurations as countersinks cause the projected slurry to be dispersed onto the granules bed 21 in divergent spray-like patterns assuring desirable division of the slurry and corresponding uniformity of its application to the granules bed. As the bed 21 undergoes granular enlargement by accumulation of the ammonia-phosphoric acid reaction product, the solids pass from the granulator through outlet 38, and vapor or unreacted ammonia separately through the shroud outlet 39.

By selective adjustment of valves 31 and 34 the rates and ratios of the slurry flow and steam delivery may be controlled to maintain most effective dispersion and projection of the slurry feed as well as to assure continuous non-clogging operation of the distributor through the combined effects of steam heat imparted to the slurry, and its unrestricted projection from passage 32 out through the countersunk openings 29.

I claim:

1. A distributor for slurried or viscous liquid comprising a pair of outer and inner concentric pipes, means maintaining the pipes in annularly spaced relation to define a passage between them, means for feeding said liquid to the passage, nozzles spaced longitudinally of said inner pipe and projecting radially therefrom to terminals within the interpipe space and in spaced axial alinement with countersunk openings in the wall of said outer pipe, and means for supplying gas under pressure to said inner pipe so that the liquid is aspirated without restriction through said openings by the gas discharges from said nozzles.

2. A distributor according to claim 1, in which the gas enters the nozzles through inner pipe openings smaller than the internal areas of the nozzles.

3. A distributor according to claim 1, in which said spacing means comprises radial spacers secured to the inner pipe and engaging the inside of the outer pipe.

4. A distributor according to claim 1, in which the nozzle passage diameters are smaller than the smallest diameters of the countersunk openings.

5. A distributor according to claim 1, in which said distributor is contained within a rotary granulator shell.

6. A distributor according to claim 1, in which said pipes are positioned within a rotary granulator shell to distribute partially ammoniated phosphoric acid slurry from said passage onto a bed of ammonium phosphate granules being tumbled in the shell.

7. A slurry distributor according to claim 6, in which said gas is steam supplied to the inner pipe.

8. A slurry distributor according to claim 7, in which said shell contains means for feeding ammonia to said granules bed.

9. A slurry distributor according to claim 8, in which said distributor is positioned to distribute slurry onto the granules bed in advance of the ammonia feed thereto and angularly in the direction of the shell rotation.

10. A slurry distributor according to claim 6, in which said inner and outer pipes extending from opposite ends of the granulator shell and have valves for controlling the slurry and gas flows therethrough.

References Cited

UNITED STATES PATENTS

| 2,551,538 | 5/1951 | Hensel | 239—424 |
| 3,362,809 | 1/1968 | Tucker | 23—259.2X |

JAMES H. TAYMAN, Jr., Primary Examiner

U.S. Cl. X.R.

23—286; 107; 71—43; 259—4; 261—76, 11; 239—424, 566